United States Patent [19]
Khouzam et al.

[11] Patent Number: 5,468,422
[45] Date of Patent: Nov. 21, 1995

[54] COMPOSITION FOR USE IN WASHING AND CLEANSING VULCANIZATION MOLDS

[75] Inventors: Cesare Khouzam, Milan; Gianfranco Ferroni, Monza, both of Italy

[73] Assignee: Silvani Antincedi, Milan, Italy

[21] Appl. No.: 119,173

[22] PCT Filed: Feb. 4, 1992

[86] PCT No.: PCT/IT92/00011

§ 371 Date: Sep. 21, 1993

§ 102(e) Date: Sep. 21, 1993

[87] PCT Pub. No.: WO92/16346

PCT Pub. Date: Oct. 1, 1992

[30] Foreign Application Priority Data

Mar. 22, 1991 [IT] Italy ................................... MI91A0787

[51] Int. Cl.$^6$ ................................ C11D 1/42; C11D 1/20
[52] U.S. Cl. ........................ 252/544; 252/153; 134/38
[58] Field of Search ................................... 252/544, 153; 134/38

[56] References Cited

U.S. PATENT DOCUMENTS

| | | | |
|---|---|---|---|
| 3,762,952 | 10/1973 | Gouin et al. | 134/38 |
| 4,097,397 | 6/1978 | Mizutani et al. | 252/153 |
| 4,235,898 | 11/1980 | Watanabe et al. | 424/245 |
| 4,612,058 | 9/1986 | Geke et al. | 134/38 |
| 4,675,125 | 6/1987 | Sturwold | 252/118 |
| 4,765,844 | 8/1988 | Merrem et al. | 134/38 |

OTHER PUBLICATIONS

Derwent's Abstract, No. 90–222 543/29, SU 15 126 901, publ. week 9029, Mosc Burevestruk (Oct. 7, 1989).

Primary Examiner—Richard L. Raymond
Assistant Examiner—Deborah Lambkin
Attorney, Agent, or Firm—Laff, Whitesel, Conte & Saret, Ltd.

[57] ABSTRACT

The new composition for use in washing and cleansing vulcanization molds in the manufacture of tires or other rubber items comprises: a) 10 to 90% of an amine mixture; b) 2 to 20% of a nonionic or anionic surface-active agent or a surface-active agent mixture; and c) 90 to 10% of a solvent.

6 Claims, No Drawings

COMPOSITION FOR USE IN WASHING AND CLEANSING VULCANIZATION MOLDS

This application is a 371 of PCT/IT 92/00011 filed Feb. 4, 1992.

The present invention relates to a new composition for use in washing and cleansing vulcanization molds for the manufacture of tires or other rubber items, characterized by excellent efficiency and complete absence of mold corrosion. In greater detail it refers to a composition for cleansing the vulcanization molds in the manufacture of tires comprising:

a) 10 to 90% of an amine or an amine mixture, b) 2 to 20% of a nonionic or anionic surface-active agent or a surface-active agent mixture, c) 90 to 10% of a solvent.

It is known that three main parts can be distinguished in a tire, that is a tread, a carcass and a bead which is the tire portion ensuring its fastening to the rim. Taken as a whole, a tire can be considered as an assembly of materials of very high elasticity (best known as "mixtures") the base constituents of which are natural or synthetic rubbers and materials of very weak deformability usually consisting of cables, wires or sheets.

The mixture forming the tire tread must above all ensure a great strength to wear and an unusual and extraordinary grip to the road. As above said, generally a mixture is made up of (a) natural or synthetic rubbers, (b) reinforcing fillers greatly increasing the mechanical strength of the tires, above all ultimate strength and strength to wear, and (c) vulcanizing agents. The mixture preparation involves mixing and bonding operations carried out by means of inner mixers the elements of which are two helical blade cylinders, the blades rotating in opposite directions in a closed casing. These operations aim at increasing the rubber plasticity. In addition mixtures have the function of introducing other particular substances such as plasticizers, fillers, vulcanizing agents, etc. into the rubber.

The tire is then made by employing ply layers and section members made of mixtures according to a predetermined order involving position displacements carried out after careful evaluation. This operation is performed on cylindrical horizontally-disposed rubber drums. In the case of radial tires, the first operation consists in laying down a mixture sheet during one or two revolutions of the drum, which sheet will constitute the inner part of the finished tire. Then the ply layers that will form the carcass and the various section members are placed thereon, said section members being located at the end of a sleeve to which the beads are fitted.

Finally the so-called "tucking-in" takes place which consists in folding in around the beads the edges of the sleeve already arranged on the drum. The tire manufacture goes on with the laying of the section members designed to become the tire sidewalls. At this point the tire appears as a cylindrical sleeve that must become of toroidal form. Then compressed air is sent into the drum on which the tire is located and on this torus the belt layers and the section member that will become the tread are subsequently disposed in succession. By reducing pressure within the working sleeve, said sleeve will resume its starting configuration.

By vulcanization it is normally meant the operation by which mixtures are passed from the plastic state to the elastic state. To this end the tire is introduced into a mold having the tread patterns and the various inscriptions to be put on the tire reproduced in a raised or cut in condition. Disposed within the torus constituting the casing is a rubber diaphragm into which hot water under pressure is generally circulated once the matrix has been closed onto the tire. This fluid forcibly pushes the mixture against the matrix walls, while steam is flowing at the outside of the matrix. The hot water under pressure and steam bring to the tire all heat necessary to vulcanization. Temperature and time depend on the tire thickness and generally a temperature of 130° C. to 170° C. is applied for a period ranging from 30 minutes to some hours.

While vulcanization molds for big tires are still made of steel, currently tire molds for motorcars have been replaced by molds made of alluminium or aluminium alloys and generally consist of two side panels or walls and approximately eight upper segments that surround the whole tread, close themselves thereupon and give it the desired structure. Provided within these segments are the so-called vent holes from which air comes out during the vulcanization.

However this operation promotes the introduction of small amounts of vulcanized rubber into the holes, which can be noticed in a new tire on the surface thereof in the form of cylindrical projections.

For cleaning the vent holes the use of helical points is required and since these points are of very small diameter, they break due to the material toughness; at all events for this procedure an unacceptably long time is required. Attempts have been made to overcome the problem relating to the holes by increasing the number of segments covering the carcass, that is using some hundreds of smaller tread segments in which air escapes through the gaps existing between the segments so that it is no longer necessary to provide these segments with vent holes.

However, irrespective of the type of mold used, as the number of vulcanizing operations increases, the mold becomes dirty and the tread-shaping cavities are lined with ebonized rubber layers that must be removed in order not to impair the homogeneity of the final product.

Initially the mold cleaning was carried out by the use of abrasive material consisting of ground wallnut shells for example, but the metal was subjected to a too great wear. Then it has been thought of resorting to washings with alkaline solutions, but these procedures too do not give good results in that they do not succeed in cleaning the vent holes and above all lead to the metal wear due to corrosion which makes the final manufactured article unacceptable. A washing with a solution of nitric acid and bichromates which has been already used for cleaning aluminium alloys in aircrafts has been also tried. However, if on the one hand this treatment is efficient for removing paints or resins from cockpits and wings, on the other hand it is to be considered as a too drastic and dangerous system for cleaning molds. It has also been possible to increase the number of vulcanizations before the occurrence of the above mentioned drawbacks by coating at least the parts in contact with the tire with Teflon (registered trademark for a polytetrafluoroethylene resin), but Teflon coating is expensive and little by little Teflon too is subjected to wear and separates thereby exposing the mold surface to the above problems. Irrespective of the adopted method, as the time goes by the molds must be either restored or discarded, which adversely affects the final manufacturing costs.

Presently the mold cleaning is carried out by water jets containing silica or plastic material microballs.

Unfortunately in each cleansing cycle the reduction of 1 micron material takes place, above all at the contact points between the various segments. After about one year and a half the letters on the side walls disappear and the edges between the segments tend to become smoothed. Often the microballs penetrate into the vent holes which makes the functional character of the operation more complicated, so that the situation is further worsened.

As above specified, irrespective of the way adopted for cleaning the mold, there is always some metal abrasion that occurs in a uniform manner. The decrease in thickness at the different points often is uneven so that the homogeneity in the tire roundness is lacking, which brings about the possibility of formation in use of harmonic waves that increase the tire noise. Especially in the case of molds providing a great number of small segments, the corrosion or wear of the same is unacceptable and the cleaning by means of plastics microballs has proved that some of them get stuck between the sections, so that said segments do not perfectly match any longer and it becomes problematic to achieve a tire of good quality.

In the case of these new molds therefore, the only applicable way is the chemical washing which however, when the use of normal cleansing products presently available on the market is concerned, leads as well to important corrosion phenomena.

Due to all the above drawbacks there is nowadays a tendency to carry out the cleansing of the mold when strictly necessary (generally this operation is carried out every 1000–1500 vulcanizations), so that the molds become dirtier and the qualitative standard of the tire gets worse as the number of vulcanizations increases.

There is therefore an urgent request for a cheap, simple and sure method enabling the vulcanization molds for tires and other rubber items to be efficiently cleaned through chemical way, without said molds being corroded and without resorting to long and arduous procedures such as the manual ones.

It has been surprisingly found that the intended aim could be achieved in accordance with the invention if for washing the molds a new composition was used, comprising:

a) 10 to 80% of an amine or an amine mixture, b) 2 to 20% of a nonionic or anionic surface-active agent or a surface-active agent mixture, c) 80 to 10% of a solvent.

A mold dipped in such a composition for a period of about one hour at a temperature in the range of 50° C. to 130° C. ensures a perfect cleansing with the complete absence of corrosion. To speed up the washing procedure and achieve still better results, the washing composition can be used in an ultrasonic wave-generating system. The maximum effect will be achieved when the mold face is turned towards the ultrasonic wave source.

Although we do not want to be bound by any theory, this surprising improvements caused by ultrasonic waves could be explained as follows. It is known that it is impossible to precisely define the upper limit of the ultrasonic band that for some applications can be very high. When submitted to the ultrasonic effect, the elements of the matter undergo very big accelerations even at moderate amplitudes; at 800 kHz an amplitude of 1 Å corresponds to an acceleration of 250 g.

At much lower frequencies, there are many effects of the ultrasonic waves on the matter. When they pass through a body for example, part of their energy can degrade into heat within the body itself and this thermal effect causes the heating of the body.

In chemistry, applications of ultrasonic waves are very widely used, in particular where substances of different nature must be mixed together. Ultrasonic waves can also act as catalysts, enable liquids to be degassed, and a phenomenon of coagulation of solid fine particles is noticed in gases. It could consequently be assumed that in the case in question ultrasonic waves catalyze the action of the cleansing composition on the molds, thereby promoting the separation of the dirt particles from the wall and the penetration of the composition into the vent holes.

Consequently, it is an object of the present invention to provide a new composition for use in washing and cleansing vulcanization molds for the manufacture of tires or other rubber articles, characterized in that it comprises:

a) 10 to 80% of an amine or an amine mixture, b) 2 to 20% of a nonionic or anionic surface-active agent or a surface-active agent mixture.

c) 80 to 10% of a solvent.

Appropriate amines for preparing the composition of the invention are alkanolamines, alkylalkanolamines, alkoxyalkylamines, aminoalkylalkanolamines and alkylalkoxyalkylamines containing 2 to 20 carbon atoms in the molecule. Examples of these amines are: monoethanolamine, diethanolamine, triethanolamine, monomethylethanolamine, monomethylbutanolamine, monomethylpropanolamine, dimethylethanolamine, dimethylpropanolamine, dimethylbutanolamine, propylethanolamine, butylethanolamine, butylpropanolamine, dimethoxyethylamine, dimethoxypropylamine, dimethoxybutylamine, dimethoxyheptylamine, diethoxypropylamine, diethoxyhexylamine, diethoxyoctylamine, aminomethylethanolamine, aminoethylethanolamine, aminobutylpropanolamine, aminobutylbutanolamine, aminoethylhexanolamine, methylpentoxyethylamine, metylpentoxybutylamine, ethylbutoxyhexylamine, ethylhexoxypropylamine, ethylhexoxybutylamine, ethylhexoxyhexylamine, methylpentoxypropylamine, methylhexoxypropylamine, butylpentoxyethylamine, propylethoxymethylamine, propylbutoxyethylaimine, etc.

Preferred solvents to be used in the composition of the present invention are glycol ethers, such as diethylene glycol dimethylether, diethylene glycol diethylether, ethylene glycol monomethylether, ethylene glycol monoethylether, ethylene glycol monopropylether, ethylene glycol monobutylether, ethylene glycol monophenylether, diethylene glycol monomethylether, diethylene glycol monethylether, diethylene glycol monopropylether, diethylene glycol monobutylether, triethylene glycol monomethyleether, triethylene glycol monoethylether, triethylene glycol monopropylether, triethylene glycol monobutylether; derivatives from benzene such as for example anisole, isophorone and other usual solvents for higher amines.

Used as nonionic surface-active agents are ethoxilated fatty alcohols and ethoxilated alkyl phenols such as for example ethoxilated octyl phenol, nonyl phenol and decyl phenol having 4 to 20 moles of ethylene oxide, or alkyl phenols alkoxilated with propylene oxide, and ethylene oxide/propylene oxide mixture or styrene oxide.

Also adapted as surface-active agents are fatty acid alkanolamides such as fatty acid mono- and di-ethanolamides containing 12 to 18 carbon atoms.

Used as anionic surface-active agents can be alkyl sulfonates, alkylaryl sulfonates, ethoxilated or non-ethoxilated sulfate alcohols, $C_{12}$–$C_{18}$ sulfonated α-olefins such as petrosulfonates, dodecylbenzene sulfonate, laurylether sulfate and the like.

EXAMPLE 1

A vulcanization mold for tires is dipped in a bath comprising:

a) 70% of monomethylethanolamine, b) 3% of lauryl alcohol, c) 3% of acid-modified ethanolamine, and d) 24% of diethylenglycol monobutylether, and the bath temperature is held at approximately 80°–120° C. Then the ultrasonic system is put into operation, the dirty face of the mold facing the ultrasonic source, and the mold is allowed to stand in the bath for 50 minutes. At this point the mold is withdrawn, immersed into a tank where the remaining traces of dirt are removed by water jets under pressure and subsequently a final rinsing with decalcified water is carried out. The cleaned and dried mold has a bright appearance and looks like a new mold in which any corrosion is completely absent.

EXAMPLE 2

As good results as in the above example have been achieved by operating as described in the Example 1 but using the following compositions for the washing:

Composition A a) 70% of dimethylpropanolamine, b) 30% of fatty acid-modified diethanolamine, c) 3% of octyl phenol ethoxilated with 9 moles of ethylene oxide, d) 24% of diethylene glycol monopropylether.

Composition B a) 70% of ethylhexoxybutylamine, b) 3% of nonyl phenol ethoxilated with 9 moles of ethylene oxide, c) 3% of $C_{12}$–$C_{14}$ sulfonated α-olefin, d) 24% of ethylene glycol monoethylether.

Composition C a) 65% of aminoethylethanolamine, b) 5% of monoethanolamine, c) 3% of fatty acid-modified diethanolamine, d) 3% of nonyl phenol ethoxilated with 9 moles of ethylene oxide, e) 24% of diethylene glycol monobutylether.

Composition D a) 60% of diethanolamine, b) 10% of monoethanolamine, c) 3% of fatty acid-modified diethanolamine, d) 3% of nonyl phenol ethoxilated with 9 moles of ethylene oxide, e) 24% of diethylene glycol monomethylether.

By replacing the above described amines with any one of those designated as the preferred ones or mixtures thereof and using the above listed solvents and surface-active agents, very satisfactory results have been achieved as well. It has been also noticed that with the compositions of the invention the overall cleansing time is reduced 4–5 times as compared with the time presently used and that the vent holes are cleaned above all due to the presence of surface-active agents and ultrasonic waves. The vent holes that are not completely cleaned, on the other hand, exhibit a deposit of softer rubber at the inside thereof so that the helical point penetrates more easily and succeeds in removing the still present intrusion with ease.

Good results have been achieved by blowing jets of compressed air at 2–4 bar into the holes.

We claim:

1. A tire or rubber article vulcanization mold cleaning composition, consisting essentially of:

(a) from 10 to 80% of an amine selected from the group consisting of monomethylethanolamine, dimethylpropanolamine, ethylhexoxyburylamine, aminoethylethanolamine, diethanolamine, monoethanolamine, and a mixture thereof, (b) from 2 to 20% of a nonionic or anionic surface active agent selected from the group consisting of a fatty acid-modified alkanolamine containing 12 to 18 carbon atoms, a fatty alcohol and an alkyl phenol alkoxylated with 4 to 20 moles of alkylene oxide; an alkylaryl sulfonate, a sulfonated α-olefin, an ethoxylated or non-ethoxylated sulfate alcohol, and a mixture thereof, and (c) from 80 to 10% of a solvent selected from the group consisting of diethylene glycol dimethylether, diethylene glycol diethylether, ethylene glycol monomethylether, ethylene glycol monoethylether, ethylene glycol monopropylether, ethylene glycol monobutylether, ethylene glycol monophenylether, diethylene glycol monomethylether, diethylene glycol monoethylether, diethylene glycol monopropylether, diethylene glycol monobutylether, triethylene glycol monomethylether, triethylene glycol monoethylether, triethylene glycol monopropylether, triethylene glycol monobutylether, anisole, and isophorone.

2. A composition according to claim 1 wherein there is from 60 to 80% of said amine.

3. A composition for cleaning vulcanization molds used for the manufacture of tires or other rubber articles consisting essentially of:

(a) 65% of aminoethylethanolamine, (b) 5% of monoethanolamine, (c) 3% of fatty acid-modified diethanolamine, (d) 3% of nonyl phenol ethoxylated with 9 moles ethylene oxide, and (e) 24% of diethylene glycol monobutylether.

4. A process for cleaning a vulcanization mold used for the manufacture of tires or other rubber articles, consisting essentially of the following steps:

dipping and ultrasonicating said mold in a bath containing (a) from 10 to 80% of an amine selected from the group consisting of monomethylethanolamine, dimethylpropanolamine, ethyl-hexoxybutylamine, aminoethylethanolamine, diethanolamine, monoethanolamine, and a mixture thereof, (b) from 2 to 20% of a nonionic or anionic surface active agent selected from the group consisting of a fatty acid-modified alkanolamine containing 12 to 18 carbon atoms, a fatty alcohol and an alkyl phenol alkoxylated with 4 to 20 moles of alkylene oxide; an alkylaryl sulfonate, a sulfonated α-olefin, an ethoxylated or non-ethoxylated sulfate alcohol, and a mixture thereof, and (c) from 80 to 10% of a solvent selected from the group consisting of diethylene glycol dimethylether, diethylene glycol diethylether, ethylene glycol monomethylether, ethylene glycol monoethylether, ethylene glycol monopropylether, ethylene glycol monobutylether, ethylene glycol monophenylether, diethylene glycol monomethylether, diethylene glycol monoethylether, diethylene glycol monopropylether, diethylene glycol monobutylether, triethylene glycol monomethylether, triethylene glycol monoethylether, triethylene glycol monopropylether, triethylene glycol monobutylether, anisole, and isophorone, maintaining the mold in said bath for 30–60 minutes; and withdrawing the mold from said bath.

5. A process according to claim 4 further comprising the following steps:

introducing the mold withdrawn from the bath into a tank;

removing from the mold remaining traces of dirt by means of water jets; and rinsing the mold with decalcified water.

6. A process according to claim 4 wherein the bath temperature is from 50° to 130° C. and there is from 60 to 80% of said amine.

* * * * *